J. A. GOLDEN.
MOTION PICTURE CAMERA.
APPLICATION FILED NOV. 26, 1917.

1,340,539.

Patented May 18, 1920.
4 SHEETS—SHEET 1.

Inventor:
Joseph A. Golden
by
Abraham Press
Attorney

J. A. GOLDEN.
MOTION PICTURE CAMERA.
APPLICATION FILED NOV. 26, 1917.
1,340,539.
Patented May 18, 1920.
4 SHEETS—SHEET 2.
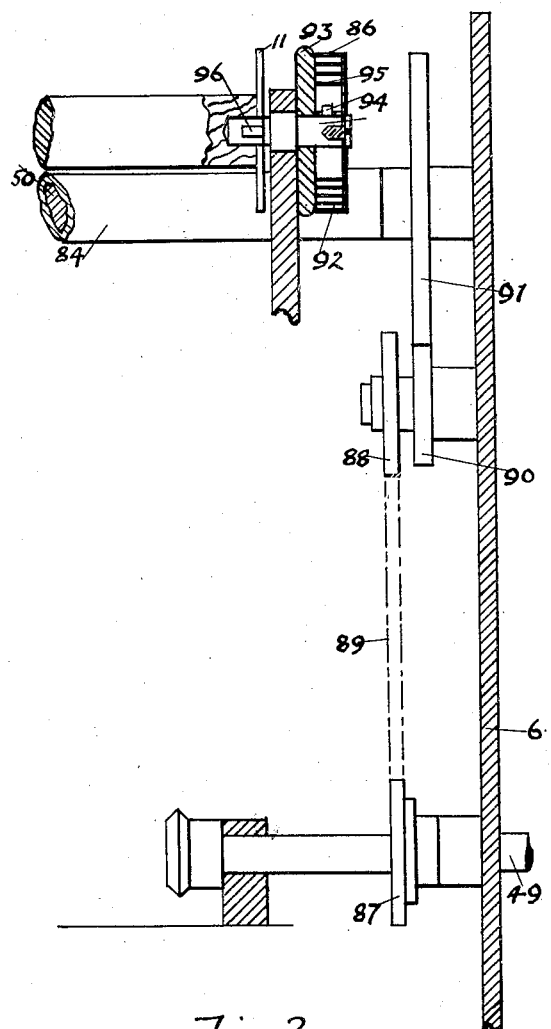
Fig 2.
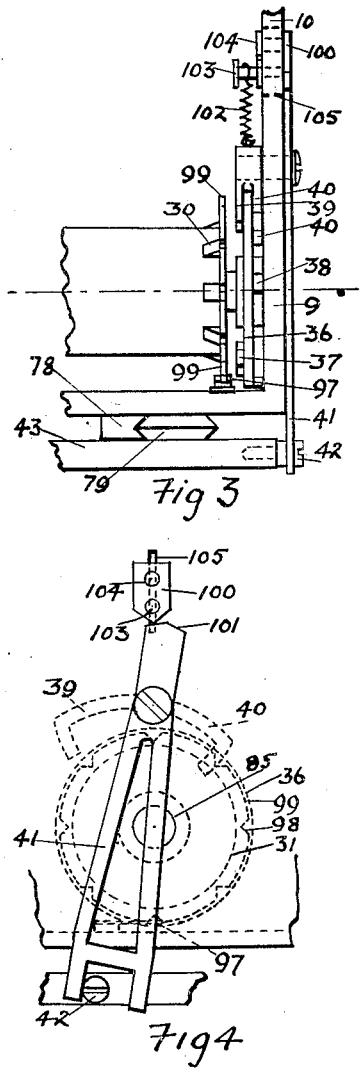
Fig 3.
Fig 4.
Joseph A. Golden
Inventor
by
Abraham Press
attorney.

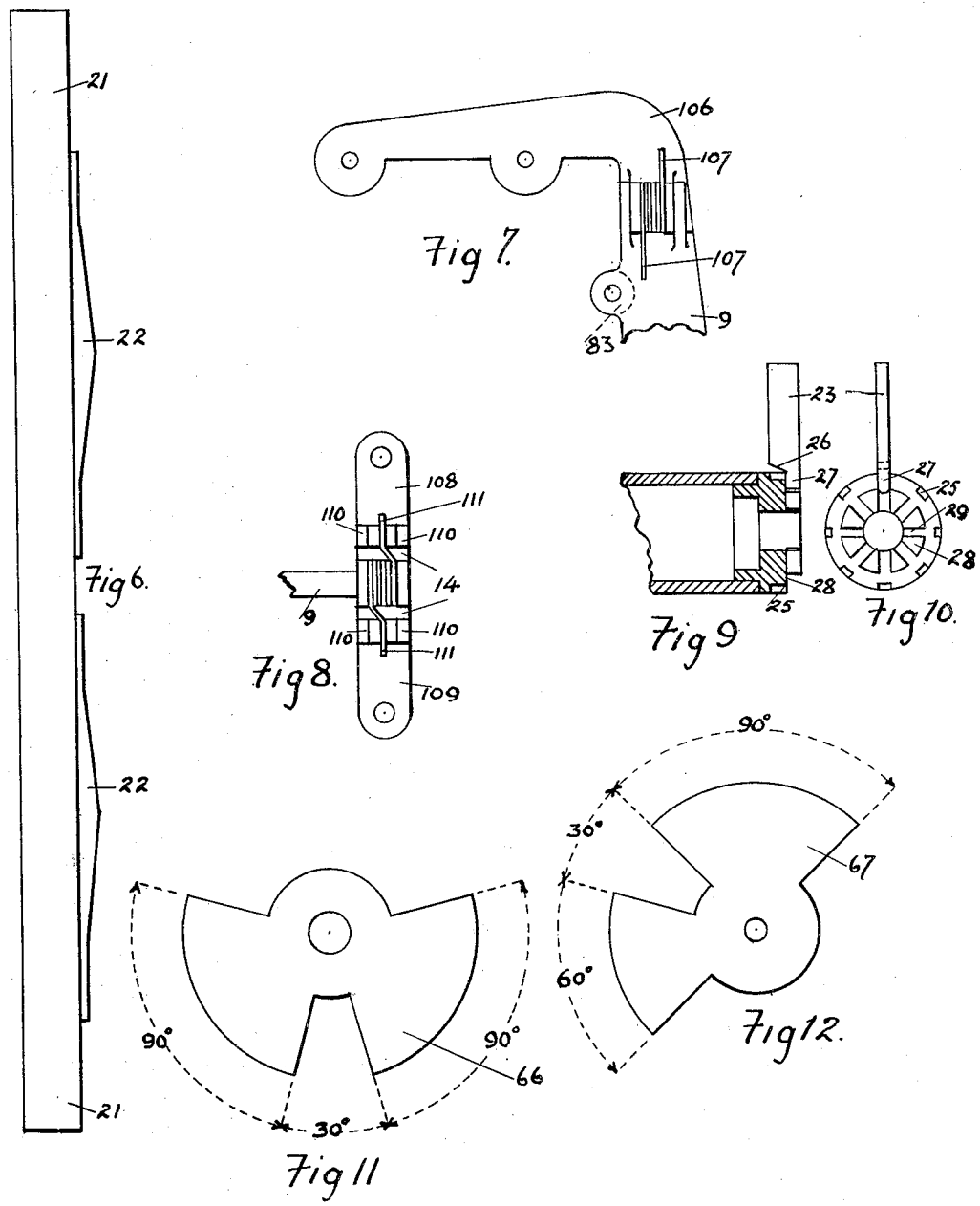

UNITED STATES PATENT OFFICE.

JOSEPH A. GOLDEN, OF NEW YORK, N. Y.

MOTION-PICTURE CAMERA.

1,340,539.  Specification of Letters Patent.  Patented May 18, 1920.

Application filed November 26, 1917. Serial No. 203,959.

*To all whom it may concern:*

Be it known that I, JOSEPH A. GOLDEN, a citizen of the United States, and resident of New York, in the county of New York and State of New York, have invented certain new and useful Improvements in Motion-Picture Cameras, of which the following is a specification.

This invention relates to motion picture cameras for home use, in which a standard kodak film, such as for example, postcard size, is used for taking a multiplicity of pictures forming a plurality of columns on the film. It has special reference to cameras of the type in which a carrier plate is employed for carrying the film in step by step relationship with regard to an exposure point in the camera.

Heretofore cameras for amateur use in which standard kodak film or the like is to be employed, have indicated some provision for pinking or indenting the film. However, up to the present no camera has been proposed in which what amounts to a perforating device has been suggested or has been used in conjunction with a piloting drum in order that the film may pass synchronously to the exposure point.

The invention contemplates a device whereby in a camera of the type above referred to, a piloting drum shall be arranged so as to make allowance for the very considerable variation in the film due to shrinkage or the like. It is not sufficient to merely provide for perforating film, but in conjunction therewith in order that satisfactory results may be obtained, it is essential that a piloting drum be provided.

An important object of the device is, therefore, one in which not only will standard kodak film or the like be perforated prior to exposure in the camera, but provision is also made whereby the same mechanism enables one to print and perforate a positive on the same type of kodak film and moreover, permits one to project by means of the same camera, taking into account all manner of variations that can arise whether from shrinkage or otherwise.

The invention, therefore, comprises a home system of cinema without the use of special devices of whatever sort other than are provided in the camera itself; and what is also most important, a system whereby the camera can be loaded whether for taking of pictures or printing without the use of a dark room and with a minimum of trouble on the part of the operator.

Thus the camera provides for perforating the negative film from the original kodak cartridge during the process of exposure. It likewise provides for unloading the negative in the ordinary manner without the use of a dark room. It further provides for loading the positive ready for printing without the use of a dark room and also in the same manner for unloading the printed positive with the same convenience as is obtainable in any kodak stationary camera.

A further object of the invention is the provision of an external manipulated means for easily varying the character of shutter opening to conform with the requirements of printing exposure and projecting.

A further object is the provision of a reflecting device whereby, by the use of a low powered incandescent lamp, a maximum of light intensity can be obtained on the projecting film.

A still further object is the provision of a multiple armed star wheel in order to avoid all possibility of jar which as is well known to the art, necessarily follows whenever a four armed star is used in cinema work. When it is recognized that by providing a carrier upon which is mounted the give-off and take-up spools beside other paraphernalia, it is seen to be very essential that the effects of inertia due to mechanical acceleration and deceleration should be avoided as far as possible. This is indeed possible by means of the multi-type of star wheel proposed in this invention.

Another very important object of the invention is the provision of a cam track which is made up of a straight track run and two semi-circular tracks at each end of the straight run. By this means greater accuracy, as well as, considerable economy in construction is obtained, obviating all necessity for special cut track ways.

By providing a pinion engaging with the track which shall have a diameter twice that of the semi-circular track ends, a maximum of advantage is obtained in the use of the film for obtaining the multiplicity of pictures side by side on the kodak film. In fact no other ratio of diameters is possible in a trackway made up of straight and semi-circular parts. In this connection it may be mentioned that the movement amounts to obtaining a rolled half arc of 60 degrees of the trackway end for a 90 degree turn of the pinion roller and engaging with said trackway.

A still further object is the provision of a pilot-extension cutter, in order that the film shall, under all circumstances be held within limits during the course of its run through the camera; and a still further object of the invention is a spring pawl device whereby the pilot drum, as well as the punching drum is impositively locked against any haphazard movement in carrying the camera about from place to place.

A further feature of the invention is the provision of an intermittent spring drive whereby the take-up spools are intermittently spring tensioned by means of the regular motion of the camera drive so that when the escapement movement provided releases the pilot drum with its film mounted thereon, the spring drive for the take-up spools is thereby automatically released to correspond with the mount of the take-up of the film.

Further objects and advantages of the invention will be apparent from the drawings when taken in conjunction with the accompanying description.

Fig. 2 is a diagrammatic view of the intermittent spring drive for the take-up spools as attached to the right hand wall of the camera.

Fig. 3 is a diagrammatic view of the escapement movement for releasing the pilot drum at the end of the cross travel to right and left of the carrier plate at the end of the step by step movements in either direction.

Fig. 4 is an end view of the same escapement movement taken at right angles to the showing of Fig. 3, looking across the camera from right to left.

Figure 1:
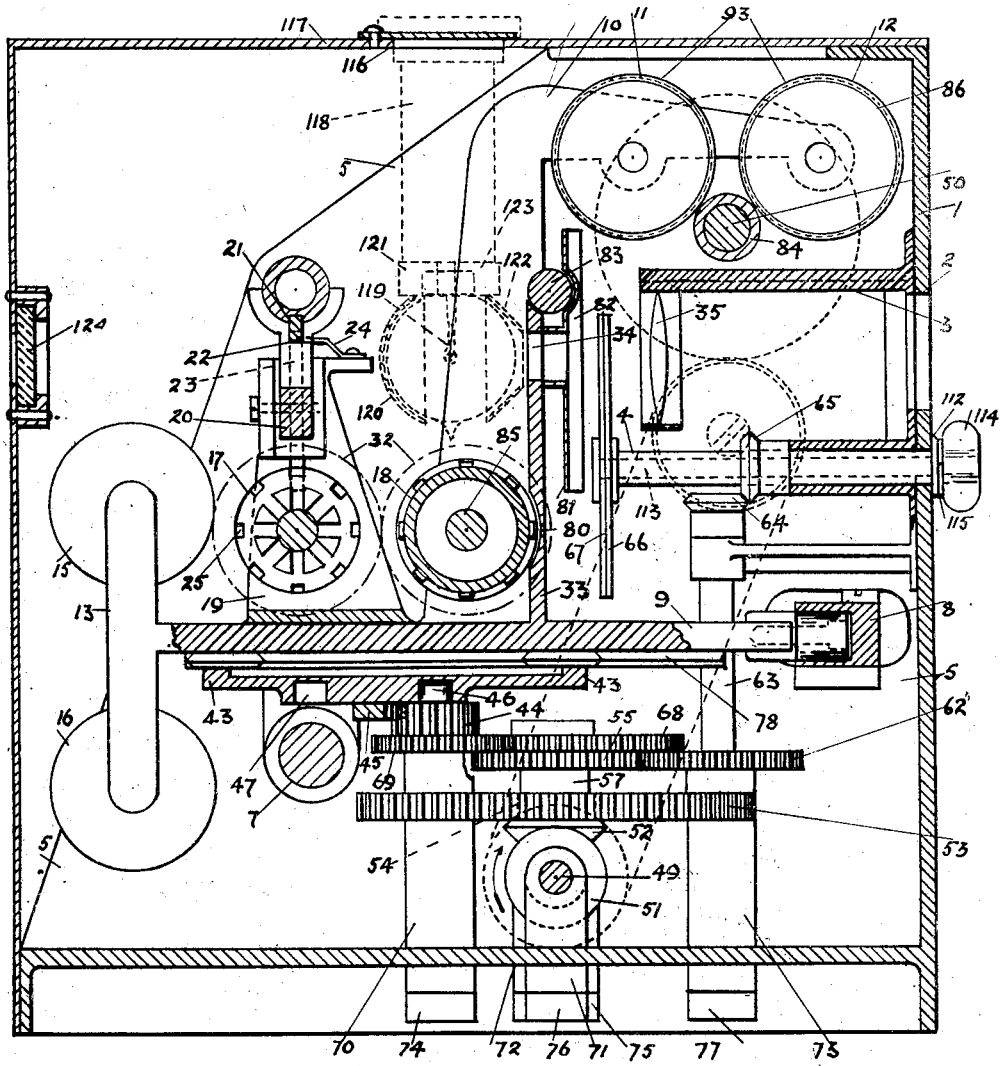
Figure 1 is a part sectional view of the camera with the right hand wall taken away in order to better expose the relative parts of the camera. The front of the camera is considered to be that facing the object in exposure.

Fig. 6 indicates the cam drive for the punches which latter are mounted upon the carrier plate housing.

Fig. 7 shows the construction of the left hand bracket plate forming part of the carrier plate housing for quickly releasing or inserting the take-up spools.

Fig. 8 is a like showing of the brackets provided on the carrier plate for readily inserting the give-off spools.

Fig. 9 is a part sectional showing of the punch device and

Fig. 10 is an end view to correspond with Fig. 9.

Figs. 11 and 12 show the novel form of the two part shutter whereby three illumination periods are easily obtained at one setting for projecting purposes and by a movement of the one with regard to the other, a variable single illumination can be obtained whether for exposure in taking a picture or in printing.

The camera comprises a housing 1, having an exposure opening 2, alongside of which is a combination lens mount and bracket 3. The bracket is for supporting the shutter spindle 4. The housing has two end walls, 5 and 6, upon one is mounted a supporting rod 7 and on the other a U shaped runway 8 for a carrier plate housing 9. Said housing has two brackets 10, for mounting a plurality of take-up spools 11 and 12.

However, on one end of the carrier housing are also provided two end brackets 13 and 14, for mounting the give-off spools 15 and 16. Upon the housing furthermore, provision is made for supporting the punch drum 17 and a pilot drum 18. A special separate bracket housing 19, is provided for supporting the punch drum, as well as, the punching device which comprises a yoke 20, reaching across the carrier plate from punch housing to punch housing, which latter forms preferably an integral part of said special bracket 19.

Mounted between the walls 5 and 6 is a punch cam rod 21, to which cam surfaces 22 are attached so that as the carrier plate travels from right to left, punches 23 will be automatically forced down to engage with the punch drum and thereby shear the ends of the film passing under the punch and over the punch drum.

In order to release the punches from the punch drum, a spring pawl 24, is provided which engages in a slot made within the punch member 23. The punch drum has at its ends a series of shearing holds 25, to coöperate with the shearing surface 26, of the punch. However, a pilot extension 27, is provided on the punch so that by always engaging the end faces 28, of the punch drum, the film is held in place by virtue of the inner faces of the punches.

Normally, the lower portion of the pilot extension is free from a series of piloting slots 29, arranged at the extreme end of the drum. However, it will be seen that the very first act on the downward travel of the punch is first for the pilot extension to engage in one of the slots, 29, and thereafter for the shearing surface 26 to coöperate with the shearing hole 25, so as to cut a double slit on the end of the film fed over the drum.

The piloting drum 18, as a further feature of the invention, is preferably mounted upon the brackets 10. Said piloting drum comprises a series of V shaped teeth 30, contiguous to flanges 31, so as to properly pilot the film through the camera. However, on the one end interlocking gears 32, are provided so that the two drums shall move synchronously.

Thus it will be seen that by mounting a kodak film upon the upper end of bracket 13, the film would be led over the punch drum 17, and then under the piloting drum and thereafter upward against an exposure rib 33, to be taken off thereafter on a take-up spool such as 11.

If then a spring tensioning drive is provided for such take-up spool, the film will always be tensioned against an exposure slot 34, opposite the lens 35, mounted in the lens mount and bracket 3. However, at the right hand end of the pilot drum is provided an escapement movement for only intermittently enabling the tensioning drive on the take-up spool to reel off a predetermined amount of film upward past the exposure slot 34, whenever the carrier plate housing reaches one extreme in its crosswise travel. To this end a sprocket disk 36, with staggered teeth 37 and 38, for example, are mounted on either side of the disk for engagement with alternating pawls 39 and 40, which latter are actuated by a fork 41, controlled by a pin 42, mounted on the cam plate 43 which reciprocates only at the end of the travel of the carrier plate housing when the latter reaches the extremes of its crosswise travel.

This latter operation takes place by virtue of a roller pinion 44, engaging with a rack 45, mounted on the cam plate. Thus as the roller 46, which is coaxial with the pinion 44, travels in the slot 47, cut in the cam plate 43 it causes rack 45 on reaching one extreme of its crosswise travel to take upon itself a small forward and backward motion. This is because the roller 46, forces the rack 45 on the cam plate to take up the position first back of the roller 46, and thereafter in front of the same roller. It is during this alternation from the roller 46, first being in the forward slot 48, and then later passing into the rear slot 47, that the pin 42, on engaging with the fork 41, releases the pilot drum the extent of a single tooth on the escapement sprocket 36.

The drive for the pinion 44, takes place through a gear train starting with the handle shaft 49, which in turn has attached thereto a gear train, operating a friction shaft 50, for elastically driving the take-up spools 11 and 12. These two latter movements will now be further explained.

Figure 5:
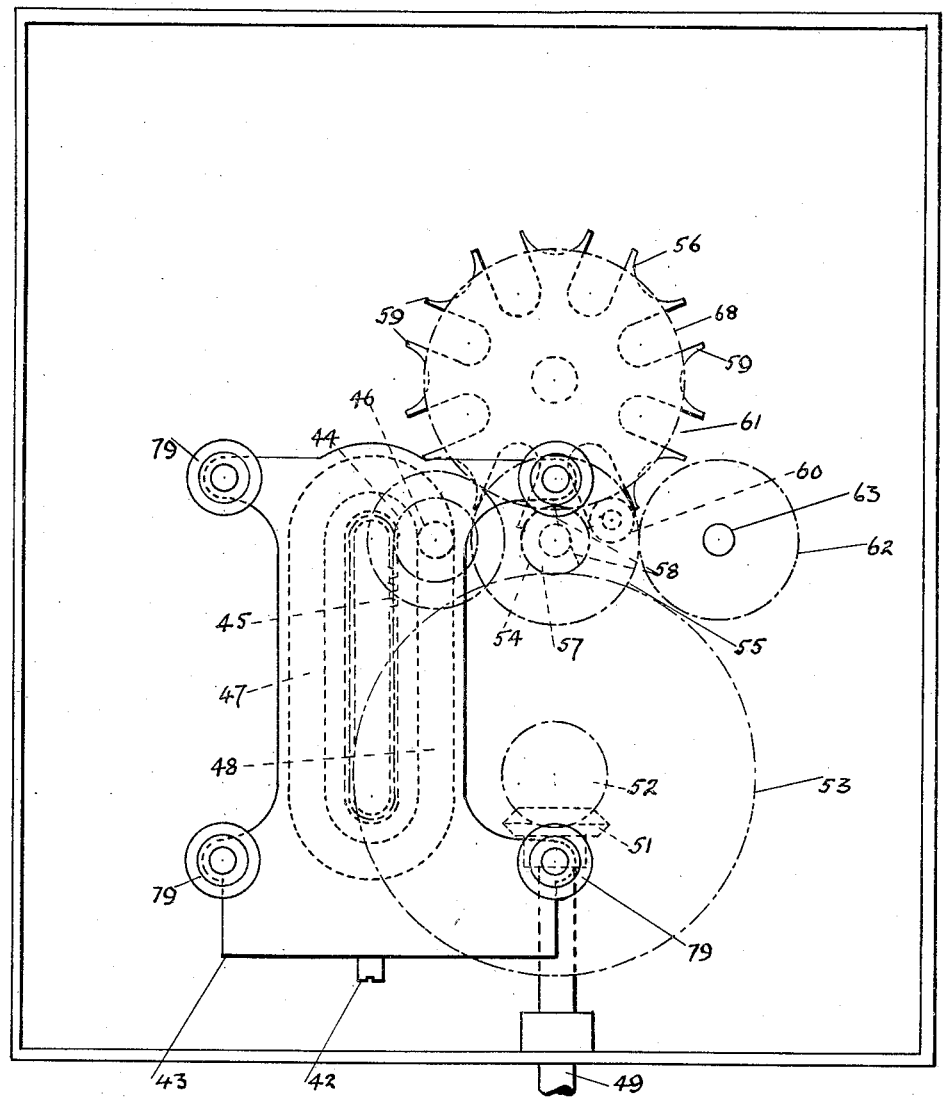
Fig. 5 is a diagrammatic plan view of the intermittent drive for the cam plate which in turn is attached to the carrier plate.

The handle shaft 49, has mounted thereon a bevel 51, which in turn engages a similar bevel 52. (See preferably Fig. 5). To this latter is attached a horizontal driving gear 53, which in turn meshes with a pinion 54, to which latter is attached a finger plate 55, for engagement with the multi-armed star wheel 56. This star wheel is preferably shown as an 8 armed star because the greater the number of arms above 4, the less is the acceleration and deceleration imparted.

The shaft carrying the finger plate has also a locking plate 57, cut away along the surfaces 58, in order to permit the prongs 59, of the star wheel to pass whenever the roller 60, of the finger plate passes into the slots 61, to give to the star wheel the necessary intermittent motion. Said finger plate is made up in the form of a gear so that it can engage with the gear 62 and the shutter drive. This latter gear being mounted upon a spindle 63, which by means of the two bevel gears 64 and 65 is enabled to transmit a uniform motion to the shutter spindle 4, upon which latter are mounted the two shutter units 66 and 67, forming the adjustable shutter control.

On the other hand, the star wheel 56, has mounted thereon a gear 68, which in turn engages a pinion 69, mounted on the same shaft to which the roller pinion 44 is attached. In order to support the gear train drives, a number of bosses are provided. Thus the spindle for the roller gear 44 is mounted in a boss 70, formed integral with the housing 1.

On the other hand, the finger plate spindle is mounted on a boss which lies beyond the boss 71, provided for carrying the bevel 52. The star wheel in like manner has its spindle centered in the boss 72, which lies immediately back of the boss carrying the bevel 52 as best shown in Fig. 1.

In the same way the spindle 63 is mounted on a boss 73. Moreover, collars 74, 75, 76 and 77 are attached to the lower ends of these spindles in order to lock them into place.

By referring to Fig. 1, it will be seen that the carrier plate housing is mounted on a supporting rod 7 on the one hand and a U shaped runway 8 on the other. It is an important feature of the invention to have the runway above and below the point of contact between the roller pinion 44 and the rack 45 of the cam plate 43, the object being to have such contact point as near the center of gravity of the step by step oscillatory structure upon which the respective take-up and give-off spools are mounted.

However, it is necessary to point out that the cam plate 43 is mounted upon the carrier plate housing by means of guide ways 78. (See in this connection Figs. 1 and 3.) It will be seen, therefore, that the cam plate is able to move forward and backward along said guide ways and yet, by virtue of the same, it takes up necessarily another of the step by step oscillatory motions to right and left of the camera.

In order to ease the friction between the respective parts, the cam plate 43, has mounted thereon V shaped rollers 79, working in corresponding slots in the guide ways 78.

On the other hand, in order to insure that the film when leaving the forward face of the pilot drum pass by the exposure slot 34 of the exposure rib 33, said rib is undercut as indicated by 80, in Fig. 1, in order that the film shall be slightly pressed against the back surface of the rib.

It should be borne in mind that the exposure slot 34, extends over the width of the film to right and left of the camera. But in order to insure proper exposure, a mask 81 is provided which latter extends across the camera to right and left and is mounted on the end walls 5 and 6 by means of a bracket such as 82.

Again, in order to ease off the film when leaving the rib to pass over on to the take-up spools, a guide roller 83, is mounted between the brackets 10 as indicated preferably in Fig. 7.

It has been stated that the take-up drums are tensioned to wind up by means of the friction shaft 50, which is continually rotated to correspond with the continued rotation of the handle shaft 49. By having the film pass from the give-off spool 15 over the punch drum 17 and under the pilot drum 18, up over the guide roller 83 on to the take-up spools either 11 or 12, it would be seen that there would be a considerable amount of slipping friction produced between the rubber covering 84, and the friction shaft 50 because the film would only be fed forward intermittently by virtue of the escapement mechanism already described, mounted upon the pilot drum shaft 85. In order, therefore, to overcome this excessive friction, a spring housing 86 is provided. (See preferably Fig. 2).

Thus, whereas the shaft 50 obtains its uniform rotation by means of a chain drive 87, 88 and 89 and the pinion 90, attached to the sprocket 88 of the chain drive which former engages with a gear 91 attached to said shaft 50; this latter drive is mounted on the right hand wall 6, of the housing 1. Thus, the take-up roller 93 of the take-up mountings by frictional contact with the rubber covering 84, produces a tension in the spring 92, which is attached to the housing 86, mounted upon to take-up roller 93 on the one hand, and on the other hand, to the take-up spindle 94. The tension is produced because of a pin or catch 95, so that by virtue of the wings 96, which are so designed so as to fit into the slots usually provided at one end of the take-up spools, an intermittent resilient drive is given to the take-up spools without causing any unnecessary jar to the mechanism.

Obviously, by turning the handle shaft 49, the spring 92, is continuously being wound up, but, on the other hand, by virtue of the escapement movement illustrated in Figs. 3 and 4, the film being wound upon the take-up spools, is released intermittently and therefore the spring 92, is intermittently released in correspondence. However, the take-up roller 93, would be in any event so designed that it would be capable of slipping over the shaft 50, if an excess of tension takes place in the spring 92 because of the variability in the amount of rotary movement necessary in the take-up roller by virtue of the varying diameter of the film on the take-up spools 11 and 12.

Ordinarily when the camera is not provided with film it would be possible for the pilot drum since it is meshed with the punching drum to cause trouble should the punch 23 not be in actual alinement with the slot 29 of the punch drum; in order to insure proper alinement a spring pawl 97, is provided to engage in slots 98, arranged in one of the flanges 99, of the pilot drum.

A further safety provision and advantage is provided by means of a spring tensioned directing member 100, which by engaging with the upper bevel extremity 101, of the fork 41, automatically pushes it either to one side or the other because of spring 102, which is attached on the one hand to the pawl structure 39, and on the other hand, to a pin 103 made integral with the directing member. However, yet another pin 104, is provided so that the two pins just mentioned can work in a slot 105, in the carrier plate housing 9, so that the fork will invariably take up a position to right or left immediately it is off dead center by virtue of the movement of the pin 42.

It will be noticed by referring to Fig. 4, that a dead period is provided for during the reciprocation of the cam plate forward and backward of the camera before the escapement pawls 39, are operated to release the piloting drum, the requisite amount of one tooth. In order to provide for a quick insertion and release of the take-up spools, an upper bracket member 106, is pivoted upon the carrier plate housing 9, and by means of a doubly armed spring, 107, the upper bracket member can easily be folded so as to enable the spools to be mounted or dismounted according to pleasure.

A similar structure is provided for the bracket members 108 and 109 for the give-off spools mounted to the left of the carrier plate housing 9. In this case, ears 110, are mounted on the bracket members so that the two armed spring 111, may invariably press them into place as soon as the give-off spools are either released or put into place.

With regard to the two shutter units 66 and 67, these are made of special form so that by superimposing 67 upon 66 and rotating them one with respect to the other, either a three part period of exposure 30 degrees in extent can be obtained for every revolution of the shutter spindle, or by making the lower member of the shutter 67 as indicated in Fig. 12, overlap the lower exposure opening of the shutter member 66, as indicated in Fig. 11 a single variable exposure period can be obtained for taking all pictures or for the printing of a positive in the camera. The member 66, is mounted on a hollow spindle 4, which passes through the housing 1, and is integral with an indicating disk 112, whereas the shutter member 67, is mounted upon a rod 113, which passes through the hollow spindle 4, and moreover, is attached to a winged member 114, so that by means of a spring washer 115, the two shutter units will in the first place, be rotatable together by means of the bevels 64 and 65, and on the other hand, the shutter unit 67, can be rotated with respect to the shutter unit 66, by the mere turning of the winged member 114, with respect to the indicating disk 112, attached to the sleeve 4, upon which is mounted the bevel 65.

So far the above description has been with reference to a camera which can be employed whether for taking or printing. However, by means of an opening 116, in the box covering 117, it is possible to insert a lamp mount 118, into which can be screwed the bulb 119. However, in order to insure the maximum amount of light available for the projecting opening in the mask 82, there is preferably provided a semispherical reflector, 120, which can be attached to the lamp mount 118, by means of spring clips 121. And furthermore in order to intensify the light, a conical reflector, 122, is mounted forward of the lamp with an opening just sufficient to cover the picture area required and by means of spring clips 123, the latter can be held in place by engagement with the mount 118.

In direct line with the mask opening is a viewing device 124, attached to the box covering 117. This latter is of such simple and usual construction, it is not necessary to go into detail thereof.

It will be seen, therefore, that I have provided a camera which not only simply and without vibration is capable of taking motion pictures, but that also enables the amateur to print, as well as expose, without any trouble over and beyond what is common to the art of kodak photography. All the operations, moreover, in no manner necessitate a dark room and because perforation or slitting of the negative or positive is automatically done in the camera, there is no difficulty in alinement of the pictures as they pass over the exposure slot.

Projection in the same camera is likewise facilitated by means of a low powered lamp which can be easily connected to the ordinary lighting system of the house or otherwise.

The operation of the device is therefore as follows:

In taking pictures, a give-off spool 15 of the ordinary kodak postcard size or the like is mounted upon the carrier plate housing by means of the adjustable brackets, indicated in Fig. 8. The film with its proper backing whether for positive or negative is thereafter passed over the punching drum and then under the pilot drum through the undercut 80, over the rib and guiding roller 83, on to the take-up spool 11 or 12. Then by means of the handle shaft 49, and the gear train engaging with the cam plate track, the carrier plate is oscillated back and forth across the field of vision of the camera by a step by step motion so as to give a series of pictures on the film across the width of the same and thereafter on the last picture of the row being taken, reeling immediately takes place by virtue of an escapement movement mounted on the pilot drum, and by means of a resilient spring drive, the film is continuously tensioned past the exposure slot so that "breathing" of the film becomes impossible. Moreover, by virtue of the gear train operating continuously upon a rubber roller, the take-up spools are continuously tensioned by means of a spring connection between the housing and the driving shaft of the take-up rollers, so that whereas there is a continual tendency to wind up the spring actuating the take-up rollers, the escapement mechanism continually permits an unwinding of the same and thereby sets up a series of zig zag exposures upon the film.

I claim:

1. A camera comprising a carrier plate for film with means for giving to said carrier plate a to and fro motion, means mounted on said carrier plate for punching a give off roll of film, means for exposing the punched film on the carrier plate so as to produce a zigzag series of pictures, and means on said carrier plate for making a take up roll out of said film.

2. A means for reeling a film past an exposure opening comprising a film carrier mechanism for holding a film in place, an intermittent escapement release for said film, a fitting for a take up spool, a spring drive for said take up spool fitting, a uniform drive directly operating both the intermittent release and the spring drive for the take up spool fitting, and an exposure means between the intermittent release and the take up spool fitting in order that the said film shall be normally tensioned during exposure.

3. A means for reeling a film past an exposure opening comprising a film carrier mechanism for holding a film in place, an intermittent escapement release for said film, a fitting for a take up spool, a spring drive for said take up spool fitting, a uniform drive operating directly both the intermittent release and the spring drive for the take up spool fitting, said film normally tensioned so as to reel as soon as the intermittent escapement operates, and an oscillatory impelling means for the film carrier mechanism interposed in the train of the uniform drive and the intermittent escapement release for giving to the film a series of zigzag exposures.

4. A camera comprising a carrier plate housing having give off and take up devices, shearing means and a piloting drum mounted on said housing, exposure means for the film carried by the housing, and further means to give to said housing a step by step oscillatory movement.

5. In subcombination a carrier plate housing, a shearing punch and punch drum mounted on said carrier plate, said shearing punch having a piloting extension and engaging the end face of the drum, and slots on the end face for guiding the shearing punch on the shearing drum.

6. A carrier plate housing according to claim 5 in combination with a piloting drum in mesh with said punch drum, and a resilient locking means to hold the slots of the end face of the punch drum opposite the piloting extension of the shearing punch.

7. In a carrier plate drive for cameras a movable carrier plate, a cam plate mounted on said carrier plate, a rack on said cam plate formed of two straight portions and two semicircular end portions, pinion means fixedly mounted and coöperating with the moving cam plate, the pitch diameter of the pinion of said pinion means being twice that of the semicircular end portions of the rack.

Signed at New York in the county of New York and State of New York this 17th day of November A. D. 1917.

JOSEPH A. GOLDEN.